United States Patent
Cox et al.

(10) Patent No.: US 12,420,867 B2
(45) Date of Patent: Sep. 23, 2025

(54) ESTIMATING HYDRAULIC FLOW IN A STEERING SYSTEM OF AN ARTICULATED VEHICLE

(71) Applicant: Caterpillar SARL, Geneva (CH)

(72) Inventors: Craig Cox, Sheffield (GB); Niall McNamee, Guildford (GB); Arick Bakken, Broughton Astley (GB); Paul Cairns, Leicester (GB)

(73) Assignee: Caterpillar SARL, Geneva (CH)

( * ) Notice: Subject to any disclaimer, the term of this patent is extended or adjusted under 35 U.S.C. 154(b) by 315 days.

(21) Appl. No.: 17/985,207

(22) Filed: Nov. 11, 2022

(65) Prior Publication Data

US 2023/0150577 A1    May 18, 2023

(51) Int. Cl.
*B62D 15/02*    (2006.01)
*E02F 9/26*    (2006.01)
*G01C 21/16*    (2006.01)

(52) U.S. Cl.
CPC .............. *B62D 15/024* (2013.01); *E02F 9/26* (2013.01); *G01C 21/16* (2013.01)

(58) Field of Classification Search
CPC ........ B62D 12/00; B62D 15/024; B62D 5/07; E02F 9/26; G01C 21/16
See application file for complete search history.

(56) References Cited

U.S. PATENT DOCUMENTS

| | | | | |
|---|---|---|---|---|
| 5,816,360 A * | 10/1998 | Spillner | .................. | B60R 16/08 180/417 |
| 8,408,352 B2 * | 4/2013 | Kasten | .................. | B62D 5/065 91/437 |
| 8,676,445 B2 * | 3/2014 | Offerle | ..................... | B62D 5/06 180/421 |
| 10,611,401 B2 * | 4/2020 | StHilaire | ................ | B62D 5/065 |
| 10,822,025 B1 * | 11/2020 | Adeeb | ..................... | F15B 11/17 |
| 2001/0004953 A1 * | 6/2001 | Takai | ..................... | B62D 5/065 180/446 |
| 2002/0014060 A1 * | 2/2002 | Dillon | .................... | A01D 41/02 56/14.6 |

(Continued)

FOREIGN PATENT DOCUMENTS

| | | |
|---|---|---|
| CN | 102935861 B | 4/2015 |
| CN | 112298348 A | 2/2021 |

(Continued)

OTHER PUBLICATIONS

European Search Report for EP. Patent Appln. No. 22204267.3-1009, mailed Apr. 12, 2023 (5 pgs).

(Continued)

*Primary Examiner* — Babar Sarwar

(57) ABSTRACT

A method of estimating hydraulic flow in a steering system of an articulated vehicle, a controller configured for the method and an articulated vehicle are provided. The method comprises:
  a) sensing a yaw rate of the articulated vehicle;
  b) sensing a velocity of the articulated vehicle;
  c) determining an estimate of a steering angle rate of the front part of the articulated vehicle using the sensed yaw rate and the sensed velocity;
  d) determining an estimate of the hydraulic flow in the steering system of the articulated vehicle using the estimate of the steering angle rate and one or more geometrical parameters of the steering system.

20 Claims, 6 Drawing Sheets

(56) References Cited

U.S. PATENT DOCUMENTS

| | | | |
|---|---|---|---|
| 2005/0236782 A1* | 10/2005 | Kobayashi | B60G 21/06 280/6.159 |
| 2013/0245909 A1* | 9/2013 | Hirose | B60T 8/17551 701/73 |
| 2013/0257016 A1* | 10/2013 | Orgeron | B62D 12/00 280/442 |
| 2014/0039753 A1* | 2/2014 | Smits | B62D 15/024 701/34.4 |
| 2021/0271255 A1* | 9/2021 | Dix | B60W 30/045 |
| 2022/0097764 A1* | 3/2022 | Hickey | B60W 30/045 |

FOREIGN PATENT DOCUMENTS

| | | | | |
|---|---|---|---|---|
| CN | 112590758 A | * | 4/2021 | B60W 10/02 |
| CN | 110949496 B | | 6/2021 | |
| CN | 112960034 A | * | 6/2021 | |
| JP | 2004196110 A | * | 7/2004 | B62D 11/24 |
| JP | 2008074393 A | * | 4/2008 | B62D 12/00 |
| JP | 2013010380 A | * | 1/2013 | |
| JP | 2013248941 A | | 12/2013 | |
| JP | 5772294 B2 | | 9/2015 | |

OTHER PUBLICATIONS

Great Britain Search Report related to Application No. 2116506.3; reported on Nov. 16, 2021.

* cited by examiner

ESTIMATING HYDRAULIC FLOW IN A STEERING SYSTEM OF AN ARTICULATED VEHICLE

CROSS-REFERENCE TO RELATED APPLICATION

This application claims priority under 35 USC § 119 and the Paris Convention to Great Britain Patent Application 2116506.3 filed on Nov. 16, 2021.

TECHNICAL FIELD

The present disclosure relates to a method of estimating hydraulic flow in a steering system of an articulated vehicle, a controller configured to carry out the method, and an articulated vehicle.

BACKGROUND OF THE DISCLOSURE

Articulated vehicles typically comprise a steering system for steering the articulated vehicle. The steering system may comprise a hydraulic component. For example, steering systems that are fully hydraulic or hydro-mechanical in nature are known. In such systems, at least a part of the motive force used to steer the articulated vehicle may be provided by hydraulic pressure within a hydraulic system of the articulated vehicle.

There is a desire to be able to estimate the hydraulic flow used by the steering system in an articulated vehicle.

SUMMARY OF THE DISCLOSURE

An embodiment of the present disclosure provides a method of estimating hydraulic flow in a steering system of an articulated vehicle, the articulated vehicle comprising articulated front and rear parts with the front part and/or rear part being steerable, the method comprising:
  a) sensing a yaw rate of the articulated vehicle;
  b) sensing a velocity of the articulated vehicle;
  c) determining an estimate of a steering angle rate of the front part of the articulated vehicle using the sensed yaw rate and the sensed velocity;
  d) determining an estimate of the hydraulic flow in the steering system of the articulated vehicle using the estimate of the steering angle rate and one or more geometrical parameters of the steering system.

Another embodiment of the present disclosure provides a controller configured to carry out the method of the above embodiment.

Another embodiment of the present disclosure provides an articulated vehicle comprising:
  a) articulated front and rear parts;
  b) a steering system for steering at least the front part;
  c) a yaw rate sensor;
  d) a velocity sensor; and
  e) a controller; wherein the controller is configured to estimate a hydraulic flow in the steering system by:
    i) determining an estimate of a steering angle rate of the front part of the articulated vehicle using a yaw rate sensed by the yaw rate sensor and a velocity sensed by the velocity sensor; and
    ii) determining the estimate of the hydraulic flow in the steering system of the articulated vehicle using the estimate of the steering angle rate and one or more geometrical parameters of the steering system.

BRIEF DESCRIPTION OF THE DRAWINGS

One or more embodiments of the disclosure will now be described, by way of example only, with reference to the accompanying drawings in which.

DETAILED DESCRIPTION

Unless defined otherwise, all technical and scientific terms used in this specification have the same meaning as is commonly understood by the reader skilled in the art to which the claimed subject matter belongs. It is to be understood that the foregoing summary of the disclosure and the following examples are exemplary and explanatory only and are not restrictive of any subject matter claimed.

The following description is directed to embodiments of the disclosure. The description of the embodiments is not meant to include all the possible embodiments of the disclosure that are claimed in the appended claims. Many modifications, improvements and equivalents which are not explicitly recited in the following embodiments may fall within the scope of the appended claims. Features described as part of one embodiment may be combined with features of one or more other embodiments unless the context clearly requires otherwise.

In this specification, the use of the singular includes the plural unless the context clearly dictates otherwise. In this application, the use of "and/or" means "and" and "or" unless stated otherwise.

The present disclosure relates generally to a method of estimating hydraulic flow in a steering system of an articulated vehicle. The disclosure includes a controller configured to perform the method and an articulated vehicle configured to be subject to the method.

Figure 1:
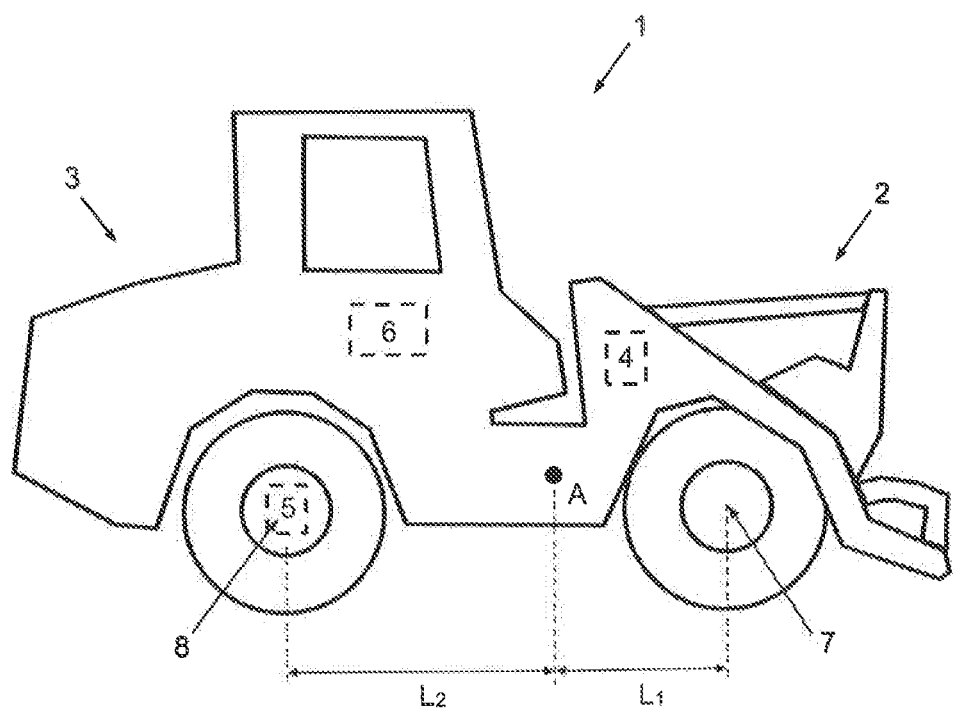
FIG. 1 is a schematic illustration of an articulated vehicle according to the present disclosure.

FIG. 1 shows a schematic illustration of an articulated vehicle 1 according to the present disclosure. The articulated vehicle 1 comprises a front part 2 and a rear part 3 that are articulated relative to each other. The articulation may be achieved by use of an articulation joint A which may be located between a front axle 7 and a rear axle 8.

The articulated vehicle 1 may be any type of vehicle having articulated front and rear parts. The present disclosure finds particular application in the field of heavy plant machinery. The present disclosure finds particular application, but is not exclusively limited to, wheeled vehicles. For example, the present disclosure may also be applied to articulated tracked vehicles. Non-limiting examples of articulated vehicles for which the present disclosure is applicable include articulated wheel loaders (including compact wheel loaders), motorgraders, wheeled scrapers, tractors, and articulated dump trucks.

The articulated vehicle 1 further comprises a steering system for steering at least the front part 2, for example a system for turning the front axle 7 relative to the rear axle 8 about a vertical axis. The articulated vehicle 1 may have a non-steerable rear axle 8, such that steering of the articulated vehicle is accomplished only by steering the front axle 7. Alternatively, both the front axle 7 and the rear axle 8 may be steerable and steering of the articulated vehicle 1 may be accomplished by turning the front axle 7 and/or the rear axle 8 about the vertical axis.

The present disclosure finds particular application, but is not exclusively limited to, articulated vehicles where the steering system comprises a hydraulic component. For example, steering systems that are fully hydraulic or hydro-mechanical in nature. In such systems, at least a part of the motive force used to steer the articulated vehicle 1 is provided by hydraulic pressure within a hydraulic system of the articulated vehicle. For example, the hydraulic system may comprise one or more hydraulic actuators, e.g. hydraulic cylinders, that may be extended and retracted to provide motive force acting directly or indirectly on the wheels or mechanical elements of the steering system connected to the wheels as known in the art. The hydraulic pressure for activating the hydraulic actuators may come from a hydraulic fluid contained in a reservoir and flow lines of the hydraulic system. The hydraulic fluid in the reservoir and flow lines may be pressurised by one or more pumps.

The hydraulic system of the articulated vehicle 1 may be used exclusively for the steering system. Alternatively, the same hydraulic system may be used to provide motive force for other aspects of the operation of the articulated vehicle 1. For example, the hydraulic system, or at least a common reservoir of hydraulic fluid, may also be used for electro-mechanical-hydraulic systems of the articulated vehicle, e.g. actuators for maneuvering a work tool of the articulated vehicle, etc.

As shown in FIG. 1, the articulated vehicle 1 further comprises a yaw rate sensor 4, a velocity sensor 5 and a controller 6. The yaw rate sensor 4 is preferably associated with the front part 2. The yaw rate sensor 4 may be incorporated in, or mounted to, a portion of the front part 2 that is in fixed relationship with the front axle 7, such that the yaw rate sensor 4 is subjected to the same yaw as the front axle 7. Alternatively, in other examples the yaw rate sensor 4 may be associated with the rear part 3.

The yaw rate sensor 4 comprises a means for sensing a yaw rate of the front part 2 during operation of the articulated vehicle 1. Where, as preferred, the yaw rate sensor 4 is associated with the front part 2, the yaw rate of the front part 2, and in particular the yaw rate of the front axle 7, may be measured or calculated directly from the output of the yaw rate sensor 4. In other examples where the yaw rate sensor 4 is associated with the rear part 3, the yaw rate of the front part 2 may be calculated indirectly from the output of the yaw rate sensor 4 using the known geometry of the articulated vehicle 1. For example, where the articulation joint A is located centrally the yaw rate of the rear part 3 may be considered equal in magnitude but opposite in sign to the yaw rate of the front part 2. For other non-central positions of the articulation joint A the yaw rate of the front part 2 may likewise be easily inferred from the yaw rate of the rear part 3.

For the purposes of the present specification, the yaw rate is defined as the angular velocity of a body about the body's 'vertical axis' as measured in the local frame of reference of the body itself. Thus, when the body is level on a horizontal surface the 'vertical axis' of the body will coincide with a true vertical in an external frame of reference. However, when the body is on a sloped surface the 'vertical axis' of the body will be at an angle to the true vertical of the external frame of reference.

The yaw rate sensor 4 may, for example, comprise a piezoelectric yaw rate sensor or a micromechanical yaw rate sensor. Additionally or alternatively, the yaw rate sensor 4 may comprise a part of an inertial measurement unit (IMU).

The velocity sensor 5 comprises a means for measuring the velocity of the articulated vehicle 1. The measured velocity may be the velocity of the front part 2 or the rear part 3. The velocity sensor 5 may, for example, comprise a transmission speed sensor that reads a shaft speed of the rear axle 8 or the front axle 7. The shaft speed may then be converted to a velocity of the articulated vehicle 1 using the detected transmission ratios and known direction of movement and tyre rolling radius of the wheels.

The controller 6 is configured to perform one or more control functions of the articulated vehicle 1. The controller 6 may comprise hardware and/or software. The controller 6 may comprise a control unit or may be a computer program running on a dedicated or shared computing resource. The controller 6 may comprise a single unit or may be composed of a plurality of sub-units that are operatively connected. The controller 6 may be located on one processing resource or may be distributed across spatially separate computing resources. The controller 6 may comprise one or more programmable and or non-programmable memory units or sub-units. The controller 6 may comprise data storage and handling units or sub-units. The controller 6 may comprise or form part of an engine electronic control module (ECM) operatively connected to an engine of the articulated vehicle 1. The controller 6 may be contained wholly on-board the articulated vehicle 1 or may have some of its functions performed by remote resources located off-board the articulated vehicle 1. The controller 6 may operatively communicate amongst its sub-units and/or with external resources, e.g. the yaw rate sensor 4, the velocity sensor 5, and any off-board resources, by wired or wireless means. The controller 6 may be configured to control any or all hydraulic, electrical, mechanical, hydro-mechanical and hydro-electric systems of the articulated vehicle 1.

Figure 2:
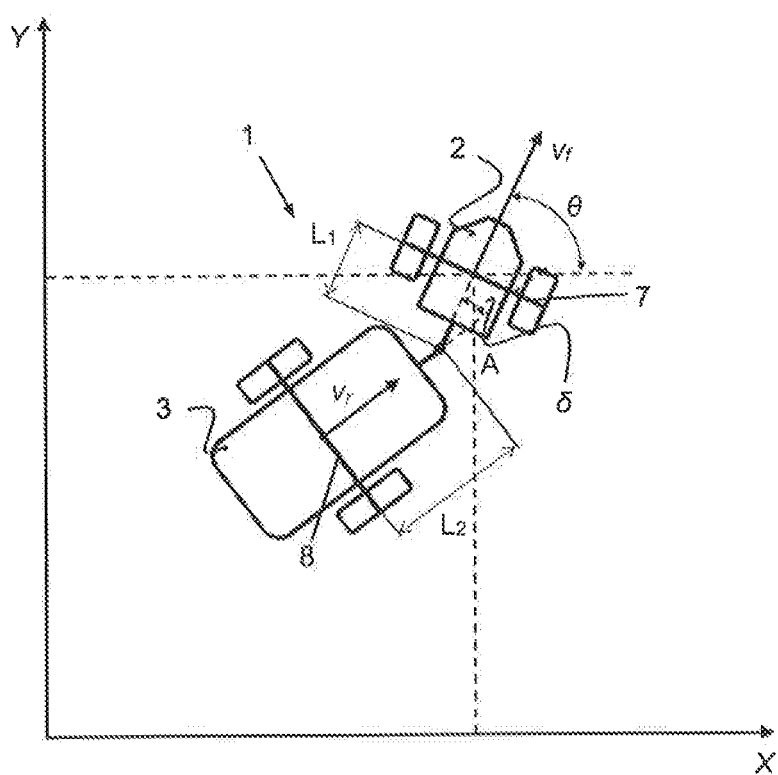
FIG. 2 is an illustration of a kinematic model for the articulated vehicle of FIG. 1.

The kinematics of the articulated vehicle 1 are illustrated in FIG. 2, wherein:
- The front part 2 and the rear part 3 are articulated at articulation joint A;
- $L_1$ is the distance from the articulation joint A to the front axle 7;
- $L_2$ is the distance from the articulation joint A to the rear axle 8;
- The total wheelbase distance of the articulated vehicle 1 is $L_1+L_2$;
- $v_f$ is the velocity of the front part 2;
- $v_r$ is the velocity of the rear part 3;
- $\theta$ is the yaw angle of the front part 2; and
- $\delta$ is the steering angle of the front part 2.

According to the present disclosure, the controller 6 is configured to estimate a hydraulic flow in the steering system of the articulated vehicle 1. The method of estimating the hydraulic flow in the steering system may be better understood with reference to the flow chart of FIG. 3 and the schematic of FIG. 4.

Figure 3:
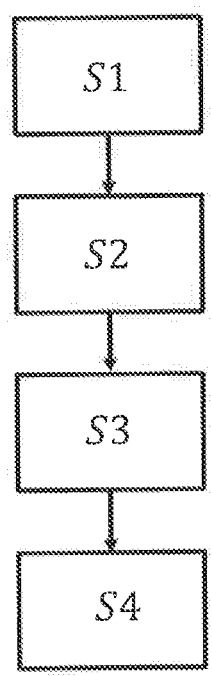
FIG. 3 is a flow chart of a method according to the present disclosure.

As shown in FIG. 3, the method may comprise:

In step S1, the controller 6 may determine a yaw rate $\dot{\theta}$ of the front part 2 of the articulated vehicle 1 using sensed input from the yaw rate sensor 4. As noted above, the yaw rate $\dot{\theta}$ may be measured or calculated directly, for example where the yaw rate sensor 4 is associated with the front part 2, or measured or calculated indirectly, for example where the yaw rate sensor 4 is associated with the rear part 3.

In step S2, the controller 6 may determine a velocity v of the articulated vehicle 1 using sensed input from the velocity sensor 5. The velocity v may be the velocity $v_f$ of the front part 2 or the velocity $v_r$ of the rear part 3. The controller 6 may determine a forward or rearward speed of the front part 2 and/or the rear part 3 using a magnitude of the velocity $v_f$ and/or $v_r$.

In step S3, the controller 6 may determine an estimate of a steering angle rate 4 of the front part 2 of the articulated vehicle 1 using the yaw rate $\dot{\theta}$ from step S1 and the velocity v or speed from step S2.

In step S4, the controller 6 may determine the estimate of the hydraulic flow in the steering system of the articulated vehicle 1 using the estimate of the steering angle rate $\dot{\delta}$ of the front part 2 of the articulated vehicle 1 from step S3 and one or more geometrical parameters of the steering system. The one or more geometrical parameters of the steering system may include the physical dimensions of the hydraulic actuator or actuators, e.g. one of more hydraulic cylinders used to move the steering system. For example, the geometrical parameters may include the internal bore diameter of the cylinder and the diameter of the rod of the cylinder.

The controller 6 may be configured to estimate the hydraulic flow in the steering system using as external inputs only the inputs from a single yaw rate sensor 4 and a single velocity sensor 5.

Figure 4:
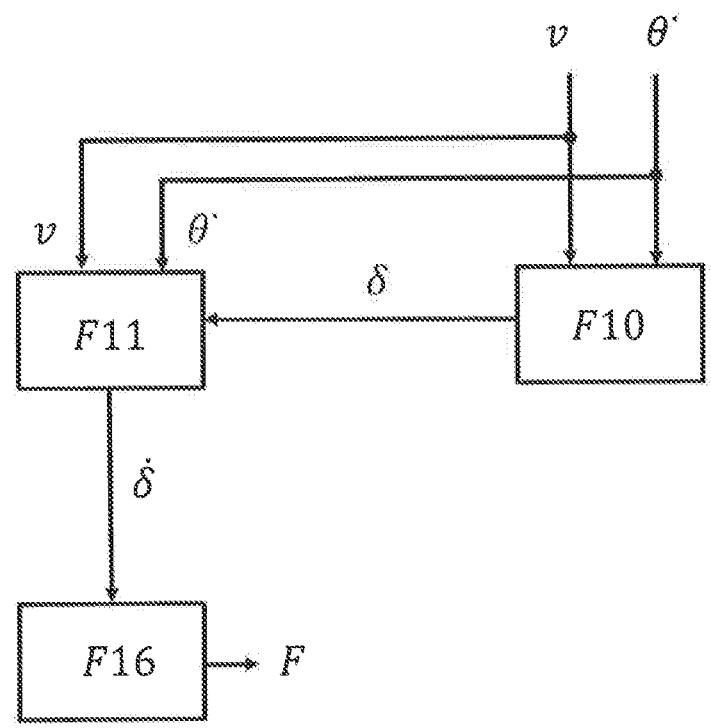
FIG. 4 is a schematic illustrating further details of a first embodiment of the method according to the present disclosure.

FIG. 4 illustrates further details of a first embodiment of the method shown generally in FIG. 3.

As noted above, in step S3, the controller 6 may determine the estimate of the steering angle rate $\dot{\delta}$ of the front part 2 of the articulated vehicle 1. The estimate of the steering angle rate $\dot{\delta}$ may be determined using the sensed yaw rate $\dot{\theta}$, the sensed velocity v and an estimate of a steering angle $\delta$ of the front part 2 of the articulated vehicle 1 that is itself calculated by the controller 6 based on the inputs of the sensed yaw rate $\dot{\theta}$ and the sensed velocity v.

For example, with reference to FIG. 4, in a first stage of Step S3, the estimate of the steering angle $\delta$ may first be determined in function F10 of FIG. 4 using the inputs of the sensed yaw rate $\dot{\theta}$ and the sensed velocity v. For example, the estimate of the steering angle $\delta$ may be calculated in function F10 using the equation:

$$\delta = \tan^{-1}\left(\frac{\dot{\theta}(L_1 + L_2)}{v}\right)$$

Next, in a second stage of Step S3, the estimate of the steering angle rate c may be calculated in function F11 using the equation:

$$\dot{\delta} = \frac{\dot{\theta}(L_2 + L_1\cos\delta) - v\sin\delta}{L_2}$$

The estimate of the steering angle rate $\dot{\delta}$ of the front part 2 of the articulated vehicle 1 is output to function F16. In Step S4, using function F16, the controller 6 may convert the estimated steering angle rate $\dot{\delta}$ to the estimate of the hydraulic flow F in the steering system.

This first embodiment may, in particular, be applied when an articulated vehicle 1 is moving with a velocity v having a magnitude above a velocity threshold value $v_t$. The velocity threshold value $v_t$ may be, for example, 2 ms$^{-1}$. At lower velocities, having a magnitude (in forward or reverse) below the velocity threshold value $v_t$, it may be preferred to use a second embodiment (described below) which includes one or more error correction steps to account for errors in the estimation of, in particular, the steering angle $\delta$ that may occur at low velocities.

Figure 5:
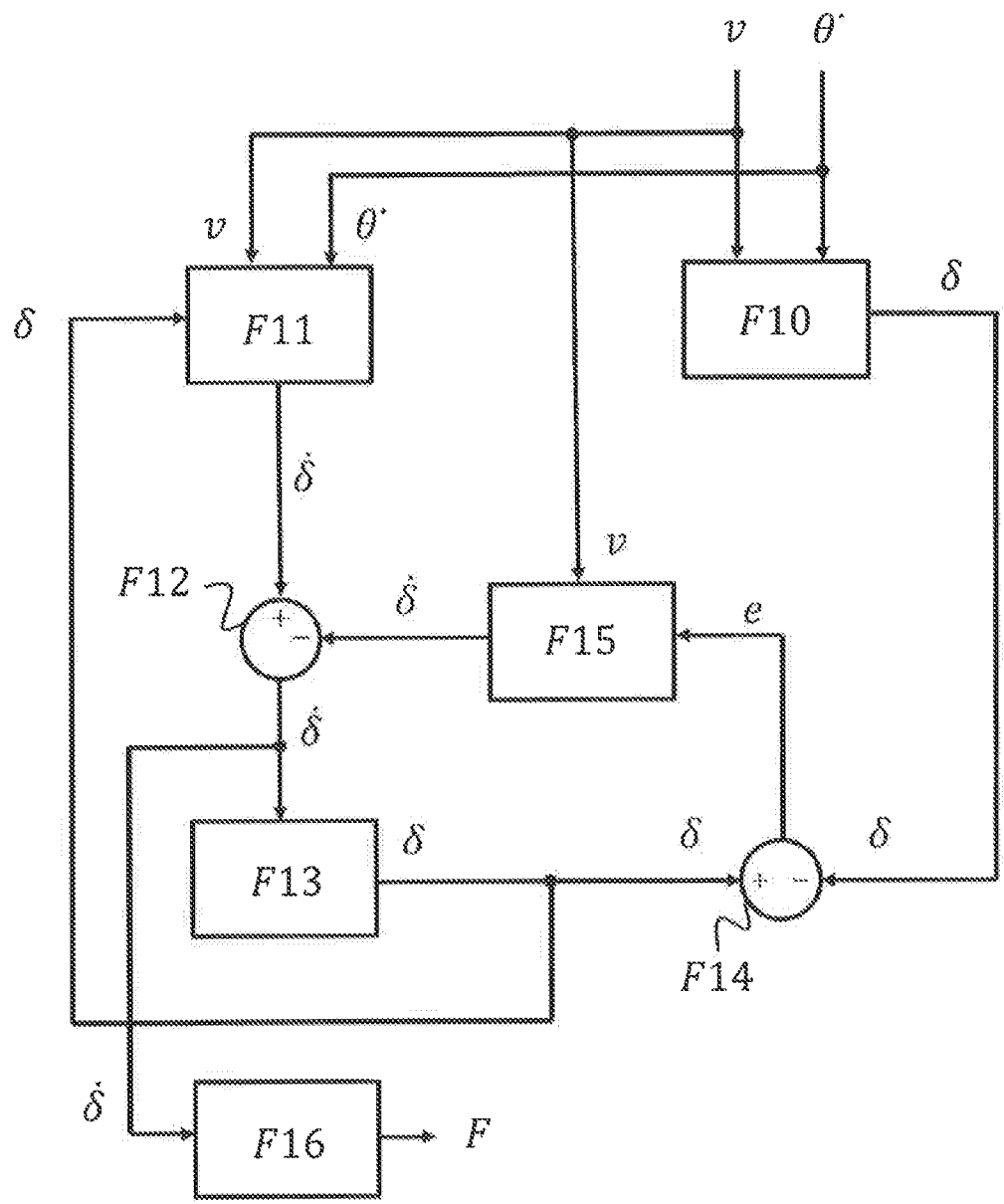
FIG. 5 is a schematic illustrating further details of a second embodiment of the method according to the present disclosure.

FIG. 5 illustrates further details of a second embodiment of the method shown generally in FIG. 3.

For example, with reference to FIG. 5, in a first stage of Step S3, a first estimate of the steering angle $\delta_1$ may be determined in function F10 of FIG. 5 using the inputs of the sensed yaw rate $\dot{\theta}$ and the sensed velocity v. For example, the first estimate of the steering angle $\delta_1$ may be calculated in function F10 using the equation:

$$\delta_1 = \tan^{-1}\left(\frac{\dot{\theta}(L_1 + L_2)}{v}\right)$$

In a further stage of Step S3, a first estimate of the steering angle rate $\dot{\delta}_1$ may be calculated in function F11 using the equation:

$$\dot{\delta}_1 = \frac{\dot{\theta}(L_2 + L_1\cos\delta) - v\sin\delta_2}{L_2}$$

where $\delta_2$ is a second estimate of the steering angle (that is derived as described below).

In function F12, the first estimate of the steering angle rate $\dot{\delta}_1$ output from function F11 is adjusted by a steering rate adjustment $\dot{\delta}_a$ (that is derived as described below) to provide a second estimate of the steering angle rate $\dot{\delta}_2$ of the front part 2 of the articulated vehicle 1, where, for example:

$$\dot{\delta}_2 = \dot{\delta}_1 - \dot{\delta}_a$$

In function F13 of FIG. 5 the second estimate of the steering angle rate $\dot{\delta}_2$ of the front part 2 of the articulated vehicle 1 is integrated to obtain a second estimate of the steering angle $\delta_2$ of the front part 2 of the articulated vehicle 1.

In function F14 of FIG. 5 the second estimate of the steering angle $\delta_2$ of the articulated vehicle 1 is compared to the first estimate of the steering angle $\delta_1$ of the front part 2 of the articulated vehicle 1 (output from function F10) to obtain an error signal, e, where:

$$e = \delta_2 - \delta_1$$

In function F15 of FIG. 5 the error signal e may be converted into the steering rate adjustment $\dot{\delta}_a$. The conversion may comprise applying a proportional gain and/or a filter based at least in part on the input velocity v of the articulated vehicle 1. In particular, it has been found that at low velocities the first estimate of the steering angle $\delta_1$ may typically become very inaccurate. Thus, at low velocities the second estimate of the steering angle $\delta_2$ is likely to be the more accurate estimate and it may therefore be desirable to minimise or zero the influence of the first estimate of the steering angle $\delta_1$.

Figure 6:
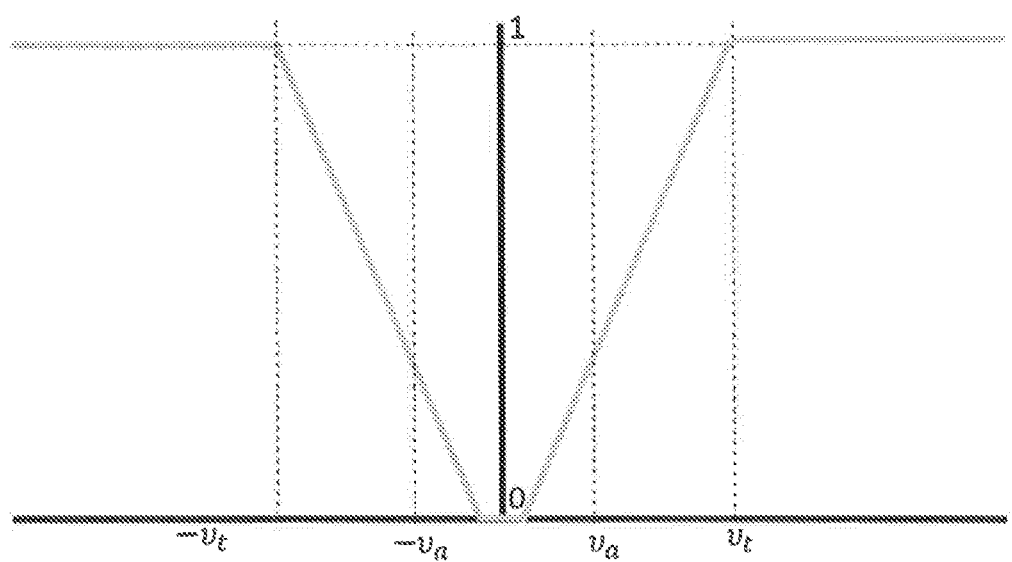
FIG. 6 is a schematic illustration of applying a multiplier to an error signal as part of a method according to the present disclosure.

Thus, function F15 may apply only a proportion of the error signal e to reduce the magnitude of the steering rate adjustment $\dot{\delta}_a$ that is output to function F12 at low velocities. In one example, as illustrated in FIG. 6, at velocity magnitudes (i.e. both forward and reverse velocities) above the velocity threshold value $v_t$ a multiplier of 1 may be applied to the error signal e such that a whole of the error signal e is used in calculating the steering rate adjustment $\dot{\delta}_a$. (in FIG. 6, the multiplier value is shown on the y-axis and the velocity on the x-axis). Below the velocity threshold value $v_t$ the multiplier may be less than unity. For example the multiplier may be decreased from a value of 1 at the velocity threshold value $v_t$, to 0 at a velocity of zero (or close to zero). The reduction in the multiplier may be linear (as shown in FIG. 6) or non-linear.

As noted above, steering rate adjustment $\dot{\delta}_a$ is fed back into function F12.

In a further, optional, aspect of the second embodiment, function F10 may be configured to output to function F14 a fixed value for the first estimate of the steering angle $\delta_1$ when the velocity is below a second velocity threshold value $v_a$. For example, the fixed value of the first estimate of the steering angle $\delta_1$ may be equal to the value of the first estimate of the steering angle $\delta_1$ last calculated as the velocity of the articulated vehicle 1 passes below the second velocity threshold value $v_a$. In this way the first estimate of the steering angle $\delta_1$ at low velocities may be held at a last calculated 'good' value. The second velocity threshold value $v_a$ may be less than or equal to the velocity threshold value $v_t$. In some examples the second velocity threshold value $v_a$ may be 0.25 ms$^{-1}$ and the velocity threshold value $v_t$ may be 2 ms$^{-1}$.

The second estimate of the steering angle rate $\dot{\delta}_2$ of the front part 2 of the articulated vehicle 1 is output to function F16. In function F16, the controller 6 may convert the second estimate of the steering angle rate $\dot{\delta}_2$ to the estimate of the hydraulic flow F in the steering system.

Any one or more of the steps S1 to S4 and/or functions F10 to F16 may apply one or more filters or limits to the parameters used. For example, one or more filters may be applied to reduce or remove signal noise. Additionally of alternatively, one or more limits may be applied to limit the minimum and/or maximum value of a parameter. For example, the maximum steering angle $\delta$ of the front part 2 of the articulated vehicle 1 may be limited to a value known to correspond to the physically-constrained maximum steering angle of the steering system. For example, noise on the estimate of the hydraulic flow F may be further reduced by dynamic rate limiting.

INDUSTRIAL APPLICABILITY

The present disclosure may find application in the control of articulated vehicles, for example in articulated wheel loaders (including compact wheel loaders), motorgraders, wheeled scrapers, tractors, and articulated dump trucks.

The method, controller 6 and/or articulated vehicle 1 may beneficially permit the estimation of the hydraulic flow in a steering system based on the inputs of yaw rate and velocity. Optionally, the estimation is based only on the external inputs of yaw rate and velocity together with known geometrical parameters of the steering system.

The method may beneficially only require, as sensors, the use of a single yaw rate sensor and a single velocity or speed sensor. These sensors may typically already be present on the articulated vehicle 1 thus potentially avoiding the need to provide and fit additional sensing means. In particular, the method and controller 6 of the present disclosure may avoid the need to use expensive articulation sensors or multiple IMUs in the vicinity of the articulation joint A of the articulated vehicle 1. Further, the method and controller 6 of the present disclosure may avoid the need to mount its yaw rate sensor 4 near the articulation joint A, which may be beneficial since often the physical space constraints and kinematics of the articulation joint A of many articulated vehicles can make sensor-mounting near the joint difficult or impossible and also prone to sensor failure.

Beneficially, the method may be configured to include one or more error correction steps to account for errors in the estimation of, in particular, the steering angle $\delta$ that may occur at low velocities.

Thus, the method and controller 6 of the present disclosure may provide an estimate for the hydraulic flow in a steering system across the full operating range of velocities of the articulated vehicle 1, including forward and reverse gears.

Knowing an estimate of the hydraulic flow taken up by the steering system may beneficially allow the controller 6 to better optimise operation of the range of hydraulic components operative on the articulated vehicle 1. For example, the estimate may be factored in when optimising operation of the electro-mechanical-hydraulic systems of the articulated vehicle, e.g. actuators for maneuvering a work tool of the articulated vehicle. For example, the estimate of the hydraulic flow taken up by the steering system, optionally together with other operational data such as the hydraulic pump pressure, may enable calculation or estimation of the hydraulic flow and power accounted for by the steering system and thereby enable calculation or estimation of a remaining level of hydraulic flow or power for the other components of the vehicle.

The estimated data of the steering angle and/or the steering angle rate may beneficially be used in some examples as inputs to a vehicle tip alarm. For example, a vehicle tip alarm may raise an alert or perform corrective action, such as slowing the vehicle velocity, if the estimated steering angle and/or steering angle rate exceeds a threshold value (which may be velocity-dependent) which may be indicative of there being a danger of the vehicle tipping over during a cornering manoeuvre.

The estimated data of the steering angle and/or the steering angle rate may beneficially be used in some examples to prevent stubbing of the steering mechanism at its end-of-travel positions. For example, the controller may use the steering angle and steering angle rate to detect that an end-of-travel position of the steering mechanism is being approached and may then take corrective action, e.g. to slow the hydraulic flow in the steering system to mitigate or eliminate stubbing.

It is to be understood that at least some of the figures and descriptions of the disclosure have been simplified to focus on elements that are relevant for a clear understanding of the disclosure, while eliminating, for purposes of clarity, other elements that the reader skilled in the art will appreciate may also be required. Because such elements are well known to the reader skilled in the art, and because they do not necessarily facilitate a better understanding of the disclosure, a description of such elements is not provided herein.

What is claimed is:

1. A method of estimating hydraulic flow in a steering system of an articulated vehicle, the articulated vehicle comprising articulated front and rear parts with the front part and/or rear part being steerable, the method comprising:
   a) sensing a yaw rate of the front part of the articulated vehicle via a yaw rate sensor in the front part of the articulated vehicle;
   b) sensing a velocity of the articulated vehicle via a velocity sensor;

c) calculating, via a controller, an estimated steering angle rate of the front part of the articulated vehicle using the yaw rate and the velocity;

d) calculating, via a controller, the hydraulic flow in the steering system of the articulated vehicle using the estimated steering angle rate and one or more geometrical parameters of the steering system.

2. The method of claim 1, wherein in step c) the estimated steering angle rate is calculated by the controller using the yaw rate, the velocity and an estimated steering angle of the front part of the articulated vehicle.

3. The method of claim 2, wherein the estimated steering angle is calculated by the controller using the yaw rate and the velocity.

4. The method of claim 1, wherein in step c) calculating the estimated steering angle rate comprises:
  i) calculating a first estimated steering angle using the yaw rate and the velocity;
  ii) calculating a first estimated steering angle rate using the yaw rate, the velocity and a second estimated steering angle;
  iii) correcting the first estimated steering angle rate to obtain a second estimated steering angle rate;
  wherein the second estimated steering angle is obtained by integrating the second estimated steering angle rate.

5. The method of claim 4, wherein correcting the first estimated steering angle rate to obtain the second estimated steering angle rate comprises comparing the second estimated steering angle to the first estimated steering angle to obtain an error signal.

6. The method of claim 5, wherein correcting the first estimated steering angle rate to obtain the second estimated steering angle rate further comprises converting the error signal into a steering rate adjustment.

7. The method of claim 6, further comprising applying a multiplier less than unity to the error signal when the velocity of the articulated vehicle is less than a velocity threshold value.

8. The method of claim 4, wherein a fixed value for the first estimated steering angle is used when the velocity is below a second velocity threshold value.

9. A controller configured to carry out the method of claim 1.

10. An articulated vehicle comprising:
  a) articulated front and rear parts;
  b) a steering system for steering at least the front part;
  c) a yaw rate sensor mounted to the front part;
  d) a velocity sensor; and
  e) a controller;
  wherein the controller is configured to calculate a hydraulic flow in the steering system by:
    i) calculating an estimated steering angle rate of the front part of the articulated vehicle using a yaw rate of the front part sensed by the yaw rate sensor and a velocity sensed by the velocity sensor; and
    ii) calculating the hydraulic flow in the steering system of the articulated vehicle using the estimated steering angle rate and one or more geometrical parameters of the steering system.

11. The articulated vehicle of claim 10, wherein the controller is configured to calculate the hydraulic flow in the steering system using a yaw rate sensed from a single yaw rate sensor and a velocity sensed from a single velocity sensor.

12. The articulated vehicle of claim 10, wherein the controller is configured to calculate the estimated steering angle rate by:
  i) determining a first estimated steering angle using the yaw rate and the velocity;
  ii) determining a first estimated steering angle rate using the yaw rate, the velocity and a second estimated steering angle;
  iii) correcting the first estimated steering angle rate to obtain a second estimated steering angle rate;
  wherein the second estimated steering angle is obtained by integrating the second estimated steering angle rate.

13. The articulated vehicle of claim 12, wherein the controller is configured to correct the first estimated steering angle rate to obtain the second estimated steering angle rate by comparing the second estimated steering angle to the first estimated steering angle to obtain an error signal.

14. The articulated vehicle of claim 13, wherein the controller is configured to correct the first estimated steering angle rate to obtain the second estimated steering angle rate by further converting the error signal into a steering rate adjustment.

15. The articulated vehicle of claim 14, wherein the controller is further configured to apply a multiplier less than unity to the error signal when the velocity of the articulated vehicle is less than a velocity threshold value.

16. The articulated vehicle of claim 12, wherein the controller is configured to use a fixed value for the first estimated steering angle when the velocity is below a second velocity threshold value.

17. The articulated vehicle of claim 10, wherein the yaw rate sensor is associated with the front part of the articulated vehicle, and the controller is configured to separately calculate the yaw rate of the front part and the yaw rate of the rear part.

18. The articulated vehicle of claim 10, wherein the yaw rate sensor is an inertial measurement unit (IMU).

19. The articulated vehicle of claim 10, wherein the velocity sensor is a transmission speed sensor.

20. The articulated vehicle of claim 10, which is an articulated wheel loaders, motorgrader, wheeled scraper, tractor, or articulated dump truck.

* * * * *